United States Patent [19]
Lee, Jr. et al.

[11] Patent Number: 5,364,898
[45] Date of Patent: Nov. 15, 1994

[54] ELECTRICALLY CONDUCTIVE ARTICLE MADE OF POLYPHENYLENE ETHER ELECTRICAL INSULATION COMPOSITIONS

[75] Inventors: Gim F. Lee, Jr., Albany, N.Y.; Kevin M. Snow, Mt. Vernon, Ind.

[73] Assignee: General Electric Company, Pittsfield, Mass.

[21] Appl. No.: 167,469

[22] Filed: Dec. 14, 1993

Related U.S. Application Data

[62] Division of Ser. No. 883,446, May 15, 1992, Pat. No. 5,294,655.

[51] Int. Cl.$^5$ .............. C08J 5/10; C08K 5/24; C08L 71/12
[52] U.S. Cl. .............. 524/265; 524/141; 524/142; 524/264; 524/267; 524/266; 524/374; 174/120 SR; 174/131 B
[58] Field of Search ............ 524/141, 142, 264, 265, 524/267, 266, 374; 174/120 SR, 131 B

[56] References Cited

U.S. PATENT DOCUMENTS

| | | | |
|---|---|---|---|
| 3,737,479 | 6/1973 | Haaf et al. | 260/824 R |
| 4,143,095 | 3/1979 | Lee, Jr. | 260/874 |
| 4,446,090 | 5/1984 | Lovgren et al. | 264/211 |
| 4,487,858 | 12/1984 | Lovgren et al. | 523/348 |
| 4,945,018 | 7/1990 | Abolins et al. | 524/141 |

*Primary Examiner*—Paul R. Michl
*Assistant Examiner*—U. K. Rajguru

[57] ABSTRACT

Improved thermoplastic compositions characterized by high tensile elongation values are described. They comprise polyphenylene ether resin, a hydrogenated elastomeric block copolymer having an A-B-A' structure, with specific molecular weight values for the copolymer blocks and a phenylsiloxane fluid of particular composition. Electrical conductor articles which include polymerized thermoplastic compositions as mentioned above represent another embodiment of this invention.

8 Claims, 1 Drawing Sheet

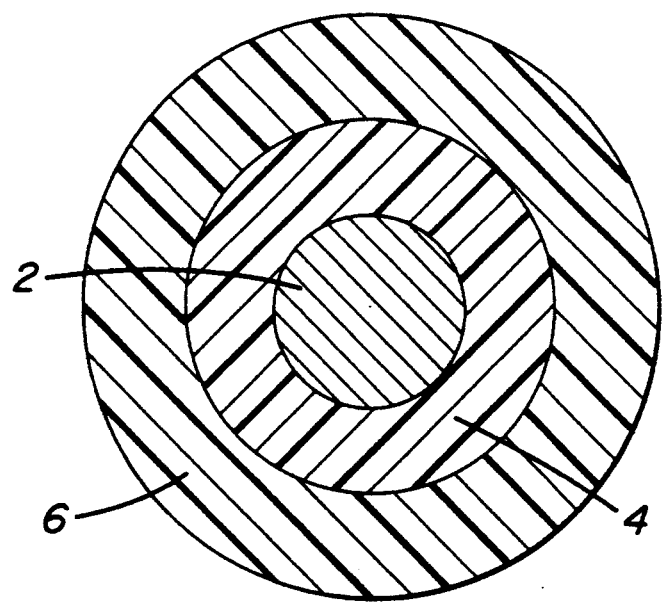

ELECTRICALLY CONDUCTIVE ARTICLE MADE OF POLYPHENYLENE ETHER ELECTRICAL INSULATION COMPOSITIONS

This is a divisional of co-pending application Ser. No. 07/883,446 filed on May 15, 1992, now U.S. Pat. No. 5,294,655.

BACKGROUND OF THE INVENTION

1. Field of the Invention

This invention relates to polyphenylene ether resin thermoplastics and more particularly to blends of such resins which are useful as electrical insulating coatings.

2. Brief Description of the Related Art

Polyphenylene ethers are a widely used class of thermoplastic engineering resins characterized by excellent hydrolytic stability, dimensional stability, toughness, heat resistance and dielectric properties. However, they may be deficient in certain other desired properties such as workability and flame retardance. Therefore, there is a continuing need for means of modifying polyphenylene ethers to improve certain properties, particularly flexibility, tensile elongation and strippability to enhance their use as wire coatings and in particular electrical insulation coatings for electrical conductors.

Polyphenylene ether (PPE) based compositions useful as dielectric insulators sometimes include polyolefins, and exhibit improved impact strength and chemical resistance. However, the inclusion of olefinic components can decrease the flame retardance of the overall composition, thereby necessitating the addition of special additives to regain this important property. As an illustration, U.S. Pat. Nos. 4,808,647 and 4,945,018 (V. Abolins et al.) describe the use of a multi-component flame retardant composition which includes an organic phosphate and a brominated material such as a tetrabromobisphenol-A oligomeric polycarbonate.

While the compositions described in the Abolins patents exhibit excellent properties suitable for many applications, it is often desirable to minimize or eliminate the use of bromine or other halogen-containing additives in compositions designed for certain products. For example, the wire insulation compositions mentioned above frequently cannot contain halogen additives because they could form corrosive compounds when exposed to flame, thereby resulting in considerable damage to surrounding electrical equipment. Nevertheless, any modification of such an insulation composition must not result in significant decreases in the other important properties necessary for very durable products, e.g., flexibility and "stretchability".

It is therefore apparent that a need still exists for polyphenylene ether-based compositions that are flame retardant, flexible, and noncorrosive. In particular, a need exists for halogen-free wire insulation compositions which are flame retardant, and which exhibit very high tensile elongation and flexibility. The compositions of the present invention obviate the need for halogen-containing flame retarding additives, employing instead a phenylsiloxane fluid ingredient which imparts a degree of flame retardance to articles made from the compositions of the invention.

A number of PPE based compositions have included as an additive polyorganosiloxanes; see for example the descriptions found in the U.S. Pat. No. 3,737,479 (Haaf). Lovgren et al, U.S. Pat. Nos. 4,446,090 and 4,487,858 show that high viscosity silicone fluids have been blended with thermoplastic polymers to produce flame retardant thermoplastic materials. However, since the polyorganosiloxanes also function as an impact-modifier in blends thereof with thermoplastic resins, their use as plasticizers was not seriously considered.

SUMMARY OF THE INVENTION

The invention comprises an electrically insulative, flame retardant, thermoplastic, flexible composition, which comprises;

(i) 100 parts by weight of a thermoplastic polyphenylene ether resin;

(ii) 5 to 50 parts by weight of a phenylsitoxane fluid, said phenylsiloxane having a weight average molecular weight within the range of from about 800 to 100,000, said phenylsiloxane consisting essentially of chemically combined units of the formulae:

(a) $(C_6H_5)_2SiO$ (b) $CH_3(C_6H_5)SiO$ and (c) $(CH_3)_2SiO$ where there is present in the phenylsiloxane fluid from 20 to 40 mole % of (a), or 40 to 80 mole % of (b), and 21 to 79 mole % of the sum of (a) +(b), based on the total moles of (a), (b), and (c); and (iii) flexibilizing proportion of an elastomeric block copolymer having a hydrogenated A-B-A' structure, wherein A and A' are polymerized vinyl aromatic hydrocarbon blocks, and B is an ethylene-butylene block, and wherein the block copolymer has a weight average molecular weight of from about 40,000 to 100,000 and the average molecular weight of each block A and A' is independently in the range of about 4,000 to about 15,000, and the weight average molecular weight of the B block is in the range of about 25,000 to about 90,000.

The compositions of the invention are useful compositions, particularly for making electrical component insulative coverings.

The invention also comprises electrical wire conductors, insulated with the compositions of the invention.

BRIEF DESCRIPTION OF THE DRAWING

The drawing is a cross-sectional side elevation of an article of the invention (insulated electrical wire).

DETAILED DESCRIPTION OF THE PREFERRED EMBODIMENTS OF THE INVENTION

Polyphenylene ether (PPE) is a well known class of synthetic polymeric resins as are methods of their preparation. Representative of polyphenylene ethers are those which comprise a plurality of recurring chain structural units having the formula:

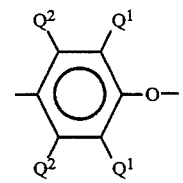

wherein each $Q^1$ is independently halogen, primary or secondary lower alkyl, phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$.

The term "halogen" as used herein means chlorine, bromine or iodine.

Examples of primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl, and the corresponding heptyl groups. Examples of secondary lower alkyl groups are isopropyl, sec-butyl and 3-pentyl. Preferably, any alkyl radicals are straight chain, rather than branched. Most often, each $Q^1$ is alkyl or phenyl, especially $C_{1-4}$ alkyl, and each $Q^2$ is hydrogen.

Both homopolymer and copolymer polyphenylene ethers are included. Representative homopolymers are those containing, for example, 2,6-dimethyl-1,4phenylene ether units. Representative copolymers include random copolymers containing such units in combination with (for example) 2,3,6-trimethyl-1,4phenylene ether units. Many suitable random copolymers, as well as homopolymers, are disclosed in the patent literature, see for example Hay, U.S. Pat. Nos. 3,306,874 and 3,306,875; Van Dort, U.S. Pat. No. 3,365,422, Bennett and Cooper, U.S. Pat. Nos. 3,639,656, 3,642,699, 3,733,299, 3,838,102, 3,661,848 and 4,092,294, and Olander, U.S. Pat. No. 4,083,828. All of these patents are incorporated herein by reference thereto.

Also included for use in the compositions of the invention are polyphenylene ethers containing moieties which modify properties such as molecular weight, melt viscosity and/or impact strength. Such polymers are described in the patent literature and may be prepared by grafting onto the polyphenylene ether in known manner such vinyl monomers as acrylonitrile and vinylaromatic compounds (e.g., styrene), or such polymers as polystyrenes and like polymers. The product typically contains both grafted and ungrafted moieties. Other suitable polymers are the coupled polyphenylene ethers in which the coupling agent is reacted in known manner with the hydroxy groups of two polyphenylene ether chains to produce a higher molecular weight polymer containing the reaction product of the hydroxy groups and the coupling agent, provided substantial proportions of free hydroxy groups remain present. Illustrative coupling agents are low molecular weight polycarbonates, quinones, heterocycles and formals.

The polyphenylene ether advantageously has a number average molecular weight ($M_n$) within the range of about 3,000–40,000 and a weight average molecular weight ($M_w$) within the range of about 20,000–80,000, as determined by gel permeation chromatography. Their intrinsic viscosity is most often in the range of about 0.15–0.6 dl./g., as measured in chloroform at 25° C.

The polyphenylene ethers are typically prepared by the oxidative coupling of at least one corresponding monohydroxyaromatic compound. Particularly useful and readily available monohydroxyaromatic compounds are 2,6-xylenol (wherein each $Q^1$ is methyl and each $Q^2$ is hydrogen), whereupon the polymer may be characterized as a poly(2,6-dimethyl-1,4-phenylene ether), and 2,3,6-trimethylphenol (wherein each $Q^1$ and one $Q^2$ is methyl and the other $Q^2$ is hydrogen).

A variety of catalyst systems are known for the preparation of polyphenylene ethers by oxidative coupling. There is no particular limitation as to catalyst choice and any of the known catalysts can be used. For the most part, they contain at least one heavy metal compound such as a copper, manganese or cobalt compound, usually in combination with various other materials.

A first class of preferred catalyst systems consists of those containing a copper compound. Such catalysts are disclosed, for example, in U.S. Pat. Nos. 3,306,874, 3,306,875, 3,914,266 and 4,028,341, all of which are incorporated herein by reference thereto. They are usually combinations of cuprous or cupric ions, halide (i.e., chloride, bromide or iodide) ions and at least one amine.

Catalyst systems containing manganese compounds constitute a second preferred class. They are generally alkaline systems in which divalent manganese is combined with such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, W-hydroxyoximes (monomeric and polymeric), o-hydroxyaryl oximes and $\beta$-diketones. Also useful are known cobalt-containing catalyst systems. Suitable manganese and cobalt-containing catalyst systems for polyphenylene ether preparation are well known in the art.

It will be apparent to those skilled in the art from the foregoing that the polyphenylene ethers contemplated for use in the compositions of the present invention include all those presently known, irrespective of variations in structural units or ancillary chemical features.

Polyorganosiloxanes are also a well known class of synthetic polymers which may be prepared by methods such as, for example, those described in the U.S. Pat. Nos. 2,469,888; 2,469,890; and 3,737,479, all of which are incorporated herein by reference thereto. The polyorganosiloxanes employed as ingredients in the compositions of the present invention are commonly referred to as "phenylsiloxane fluids".

The phenylsiloxane fluids can have a weight average molecular weight ($M_w$) of up to 100,000 and preferably 800 to 5,000. These fluids can be blended with polyphenylene ether to make the blends of the present invention. These phenylsiloxanes are well known materials and are shown in the Encyclopedia of Polymer Science and Engineering, Vol. 15, pages 258–264, John Wylie and sons, New York (1989). For example, the phenylsiloxane fluids of the present invention can be made by initially equilibrating dimethyl silicone stock (hydrolysate or distilled cyclic compounds) and a source of chain terminator, such as a trimethylsiloxy unit. Siloxy units having phenyl substituents can be introduced as diphenylsiloxane or methylphenylsiloxane. In most instances, the equilibrated fluid is devolatilized by heat and vacuum after catalyst deactivation. Phenyl substitution, for example, methylphenylsiloxy units which are equilibrated into the dimethylsiloxane backbone, has been found to increase the thermal and oxidative stability of the resulting polydiorganosiloxane. Copolymers of dimethylsiloxane with some methylphenylsiloxane have have been found to have lower pour points because the bulky groups interfere with crystallization of the methyl polymer.

In general then, the phenylsiloxane fluids employed as ingredients in the compositions of the invention comprise those of the formula:

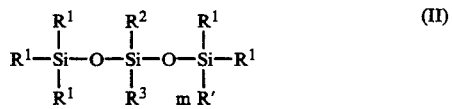

(II)

wherein each $R^1$ is alkyl, haloalkyl, aryl, aralkyl, alkaryl, alkoxy, aryloxy, and halogenated derivatives of the aforesaid aryl, aralkyl, alkaryl, alkoxy or aryloxy groups, each $R^2$ and $R^3$ are methyl or phenyl, and m is an integer of such a value that the polysiloxane is a fluid at ambient temperatures; and wherein there are chemically combined units of the formulae:

(a) $(C_6H_5)_2SiO$
(b) $CH_3(C_6H_5)SiO$ and
(c) $(CH_3)_2SiO$ where there is present in the phenylsiloxane fluid from 20 to 40 mole % of (a), or 40 to 80 mole % of (b), and 21 to 79 mole % of the sum of (a) +(b), based on the total moles of (a), (b), and (c).

The elastomeric block copolymer which must be used in the present invention is characterized by an A-B-A' structure, wherein A and A' are polymerized vinyl aromatic hydrocarbon blocks, and B is an ethylene-butylene block derived from at least one polymerized conjugated diene. In preferred embodiments, the block copolymers preferably contain between about 15% and 50% by weight of vinyl aromatics.

Center block B of the block copolymer should be almost completely hydrogenated, i.e., the average unsaturation of the copolymer should be reduced to less than about 20% of its original value. In more preferred embodiments, the average unsaturation will be reduced to less than 10% and most preferably, less than about 5% of its original value. Methods for accomplishing the hydrogenation of the B block are known in the art.

In preferred embodiments of this invention, A and A' are polymers independently derived from the group of monomers consisting of styrene, alphamethyl styrene, para-methyl styrene, vinyl toluene, vinly xylene, vinyl naphthalene, chlorostyrene, bromostyrene, dibromstyrene, and combinations thereof. Styrene monomer is most preferred.

In the preferred embodiments, center block B is derived from at least one conjugated diene such as 1,3-butadiene. In the most preferred embodiments, B is obtained via post-hydrogenation of polybutadiene.

It is essential that the polymers corresponding to each block of the block copolymer of this invention be within a certain molecular weight range. Thus, the A and A' blocks must have an average molecular weight (independently) in the range of about 4,000 to about 15,000, and most preferably, in the range of about 7,000 to about 8,000. The average molecular weight of the B block must be in the range of about 25,000 to about 90,000 and most preferably, in the range of about 30,000 to about 40,000.

The preparation of elastomeric block copolymers such as the type used in the present invention is known in the art. For example, one technique involves the successive polymerization of the monomers in solution in the presence of a monolithium hydrocarbon initiator. Further aspects of the preparation of these polymers can be found in European Patent 0,095,098; in U.S. Pat. Nos. 3,113,986; 3,431,323; 3,700,633; and 4,167,507; the contents of all of these references being incorporated herein by reference.

An especially preferred elastomeric block copolymer for use as an ingredient in the compositions of this invention comprise blocks of styrene and post-hydrogenated polybutadiene within the above-prescribed molecular weight ranges, and is often referred to as "SEBS". One commercial example is the linear KRATON®G-1652 thermoplastic rubber, available from Shell Chemical Company.

The proportion of elastomeric block copolymer present depends on a variety of factors, such as the particular type of PPE resin used, the contemplated end use of the product, and the presence or absence of other additives in the composition. In preferred embodiments, the block copolymer is present at a level in the range of about 10% by weight to about 50% by weight, based on the weight of the entire composition. In more preferred embodiments, the level is about 15% by weight to about 40% by weight, while in most preferred embodiments, the level is about 20% by weight to about 30% by weight, based on the entire composition.

The compositions of the invention may be prepared by conventional blending techniques such as by melt-blending the ingredients. In a preferred process, some of the ingredients are combined separately as pre-mix blends and then melt blended and extruded from a single or twin screw extruder. For example, blends of polyphenylene ether and the phenylsiloxane fluids can be made by roller mixing or stirring the ingredients and thereafter melt extruding the pre-blend with the elastomer and any remaining, optional ingredients to obtain a processable blend. Compression molding of the ingredients also can be used.

If desired, inert filler materials, such as titanium dioxide, silica, glass fiber, silicon carbide whiskers, carbon fibers, clay, talc, mica and the calcium carbonate can be incorporated with the polyphenylene ether and phenylsiloxane fluid during the initial blending process. The fillers can be utilized at from about 1 to 50 parts by weight of filler, per 100 parts of the polyphenylene ether/phenylsiloxane fluid blend.

In addition to the three essential ingredients described above, other, optional ingredients may be present as long as they do not detract from the overall desired properties useful for insulating coatings for electrical conductors.

Some embodiments of the present invention may include a proportion of polyolefin resin. Examples of such polyolefins are polyethylene, polypropylene, polyisobutylene, copolymers of ethylene and propylene, copolymers of ethylene and organic esters such as ethylene vinylacetate, ethylene ethyl acrylate, ethylene methyl acrylate, and the like, as well as mixtures of any polyolefins. The materials themselves are known in the art, as are methods for making them.

Preferred polyolefins are polyethylene, polypropylene, and polybutylene. Especially preferred are low density polyethylene (LDPE), very low density polyethylene (VLDPE), linear low density polyethylene (LLDPE), medium density polyethylene (MDPE), high density polyethylene (HDPE), high impact (copolymer) polypropylene, or combinations of any of the above.

An advantageous proportion of polyolefin is about 1% by weight to about 30% by weight, based on the weight of the entire composition. a preferred level is about 1% by weight to about 20% by weight, and a most preferred level is about 1% by weight to about 15% by weight.

Some embodiments of the present invention also include a plasticizer. Examples are phosphate compounds; mineral oil; phthalate-, adipate-, and sebacate esters; polyols such as ethylene glycol, and the like, as well as mixtures of any of these materials. Arylphosphates, alkylated arylphosphates, and mixtures of any of these phosphates are often preferred; many of them can also provide a degree of flame retardancy to the composition.

Examples of preferred organic phosphates include phenyl bisdodecyl phosphate, ethyldiphenyl phosphate, tri-(nonylphenyl)phosphate, tricresyl phosphate, triphenyl phosphate, alkylated derivatives of triphenyl phosphate, dibutylphenyl phosphate, 2-ethylhexyl-diphenyl phosphate, as well as mixtures of any of these materials. Also possible and sometimes preferred for use are difunctional and polyfunctional phosphate compounds, such as those described in U.K. Patent Application GB 2,043,083A of William Haaf et al. Examples of these materials are bis diphenyl phosphates of resorcinol of hydroquinone, as well as mixtures which comprise such phosphates. Other suitable phosphates are taught in the U.S. Pat. No. 4,900,768 of V. Abolins et al, incorporated herein by reference. Triarylphosphates in admixture with alkylated aryl phosphates are often most preferred for this invention.

Those of ordinary skill in the art can determine the appropriate proportion of plasticizer without undue experimentation. Usually, the plasticizer is present at a level of from about 1% to about 25% by weight, based on the weight of the entire composition; a preferred level is generally within the range of about 5% by weight to about 15% by weight.

Some embodiment compositions of this invention may also include one or more phosphite compounds, which may increase the tensile elongation of materials made from the compositions.

The phosphite compound used can be of various types, such as alkyl phosphites, aryl phosphites, alkyl-aryl phosphites, diphosphites, polyphosphites, and thio-phosphites. Many are disclosed in U.S. Pat. Nos. 4,659,760 and 4,472,546, incorporated herein by reference. Examples of suitable phosphites are triphenyl phosphite, diphenyl phosphite, trimesityl phosphite, dimesityl-phenyl phosphite, trineopentyl phosphite, didecylphenyl phosphite, dichloroethyl phosphite, tributyl phosphite, trilauryl phosphite, tris(nonylphenyl) phosphite, tridecyl phosphite, diphenyldecyl phosphite, tricresyl phosphite, triisooctyl phosphite, tri-2-ethyl-hexyl phosphite, trioctadecyl phosphite, thiophosphite, phenyldiethyl phosphite, phenyl-di-(2-ethylhexyl)-phosphite, isooctyldiphenyl phosphite, diisooctyl-monophenyl phosphite, distearyl pentaerythritol diphosphite, octadecyl 3-(3,5-di-t-butyl-4 hydroxyphenyl) propionate (e.g., ULTRANOX® 276 additive), bis (2,4- di-t-butylphenyl) pentaerythritol diphosphite (commercially available as ULTRANOX® 626 or ULTRANOX® 624), diphenyl isooctyl phosphite, diisooctyl phosphite, distearyl phosphite, diphenylisodecyl phosphite, diisodecyl pentaerythritol diphosphite, poly(dipropylene glycol) phenyl phosphite, and trilauryl trithiophosphite, as well as mixtures of the above.

An effective amount of the phosphite compound is usually in the range of about 0.01% by weight to about 10% by weight, based on the weight of the entire composition, with 0.1% by weight to about 1% by weight being most preferred. The most appropriate range can be determined according to various factors, such as the contemplated end use for the product, as well as the particular identity of the other components present.

Various other additives may be included in the compositions of this invention, their utility being of course dependent in part on the contemplated end use for the compositions. Non-limiting examples of these additives include reinforcing agents such as fibrous glass and graphite whiskers, antioxidants, mold release agents, mineral fillers, pigments, dyes, heat stabilizers, light stabilizers, processing stabilizers, abrasion resistance compounds, and the like, as well as additional flame retardants and/or plasticizers. These additives are usually included in effective amounts of between about 1% and 50% by weight of the total composition.

The invention includes electrical conductor articles, electrically insulated with the compositions of the invention described above.

with reference to the accompanying drawing (a cross-sectional, enlarged side view of an embodiment electrical wire of the invention) it may be seen that the coating composition (4) is applied over the surface of an electrical conductor, for example, copper or aluminum wire (2) or cable. Sometimes, the conductor is first coated with another material, e.g., a material which inhibits or prevents oxidation. Known methods of application are suitable, such as extrusion, followed by cooling. The coating (4) thus forms an excellent electric-insulator for the metal. If desirable, one or more outer or "jacket" layers (6) may be formed over the coating (4). These layers (6) are also often formed of a polymeric material, such as polyvinyl chloride, a polyester like polybutylene terephthalate, or a polyamide, and can also be applied by extrusion techniques, such as tandem extrusion.

Alternatively, the coating composition of this invention may be used itself as a jacket layer (6) applied over a wire insulating material (4) such as polyvinyl chloride.

The following examples describe the manner and the process of making and using the invention and set forth the best mode contemplated by the inventors, but are not to be construed as limiting the invention.

All parts and percentages in the following examples are by weight.

The following ingredients were blended in various proportions:

Polyphenylene ether - Poly ( 2,6—dimethyl—1,4phenylene) ether, having an intrinsic viscosity of 0.46 dl/g, as measured in chloroform at 25° C. from General Electric Company.

KRATON® 1652 Resin—Linear styrene-(ethylene-butylene)-styrene triblock rubber, available from Shell Chemical Company, having a total weight average molecular weight of 52,000, with each styrene block having a weight of 7,500, and the ethylene-butylene block having a weight of 37,000.

71—B Plasticizer—Mixture of tri(aryl) phosphate and alkylated derivatives thereof as described in U.S. Pat. No. 4,945,018.

GR-8320 —A 20 melt index polyethylene resin.

SF—1265 —A silicone (polyphenylsiloxane linear fluid; General Electric Company) comprised of a combination of diphenyl and dimethyl siloxane units in a molar ratio of circa 40:60. The fluid typically has a 400 to 600 centistoke viscosity, a $M_w$ of about 1600, a $M_n$ of about 400 and trimethylsiloxy termination.

ULTRANOX 626 —bis (2,4-di-t-butylphenyl) pentaerythritol diphosphite (G-E Specialty Chemicals, Inc.).

Where reported, the following physical test procedures were carried out:

Tensile properties: ASTM Test procedures D638.

The tensile elongation tests were run at 20 inches per minute on the coatings after they were stripped from the wire.

Flame Retardance Tests: performed using the Vertical Wire Flame Test, UL 1581 (1080, VW-1, as published, 1983-1985).

Heat and Smoke Release:

6"×6"×1/16" OSU plaques were compression molded from extrudate using a Pasadena Hydrolics Inc. molder. Three plaques of each blend were tested in the horizontal configuration under a radiant heat load of 35 kW/m$^2$ and continuous measurements of rates of heat and smoke release, including peak rates of heat and smoke release (PRHR, PSRR), and total heat and smoke release (HTOT, STOT) were collected over a 300 sec (5 min) period according to standard OSU protocol (ASTM E906-83).

EXAMPLES 1-4

Blends of a commercially available phenylsiloxane (SF-1265, supra.) and commercially available polyphenylene ether containing 2,6-dimethyl-1,4-phenylene ether units and having an intrinsic viscosity of 0.46 were made by directly adding the phenylsiloxane to polyphenylene ether powder, then mixed with KRATON-G 1652, polyethylene (GR-8320, supra.) and ULTRANOX-626, supra. The blend was mixed for 30 seconds.

The blends were extruded on a Werner-Pfleiderer 30 mm twin screw extruder.

Melt-blended extrudate, representing each sample was quenched and pelletized, and then remelted in an extruder equipped with a die for coating wires. The molten polymer was thereby applied to 14 gauge copper wire to form coatings which, upon cooling, were about 13 mils thick. Ribbons (10 mil thick) were extruded and tested. The test results are set forth, in the Table I below with the proportions of ingredients used.

Example 1 is not an example of the invention but is made for comparative purposes.

TABLE I

| Ingredients (Parts by Wgt) | Example No. | | | |
|---|---|---|---|---|
| | 1 (Control) | 2 | 3 | 4 |
| PPE | 51 | 51 | 51 | 51 |
| Phenylsiloxane (SF-1265) | — | 6 | 12 | 17 |
| 71-B Plasticizer | 17 | 12 | 6 | — |
| Kraton ® G-1652 | 24 | 24 | 24 | 24 |
| Polyethylene | 8 | 8 | 8 | 8 |
| Ultranox ® 626 | 0.5 | 0.5 | 0.5 | 0.5 |
| Physical Properties | | | | |
| Tensile Yield (KPSI) | 1.7 | 2.2 | 4.0 | — |
| Tensile Strength (KPSI) | 3.5 | 4.5 | 4.4 | 4.8 |
| Tensile Elongation (%) | 208 | 216 | 229 | 177 |
| Wire Coatings | 7, 4, 0, 0, 0/ | 6, 1, 0, 0, 0/ | 10, 0, 0, 0, 0/ | 10, 0, 0, 0, 0/ |
| YW-1 Results | 8, 2, 1, 0, 0/ | 8, 1, 0, 0, 0/ | 8, 1, 1, 1, 1/ | 10, 2, 0, 0, 0/ |
| | 8, 2, 0, 0, 0 | 8, 1, 0, 0, 0 | 9, 1, 1, 1, 1 | 11, 2, 0, 0, 0 |

In addition to retention of good flame retardancy, the phenyl siloxane fluid appears to improve strippability from copper wire.

The results show that PPE based compositions, having very good flexibility elongations and flame retardancy, can be obtained in high rubber content blends with the use of phenylsiloxane fluids. This can be accomplished in the absence of, or in combination with, aromatic phosphates.

EXAMPLES 5-9

Blends of a commercially available phenylsiloxane (SF-1265, supra.) and commercially available polyphenylene ether containing 2,6-dimethyl-1,4-phenylene ether units and having an intrinsic viscosity of 0.46 were made by directly adding varying proportions of the phenylsiloxane to polyphenylene ether powder, then mixed with 8 pHr of the 71-B plasticizer, supra. The blend was mixed for 30 seconds.

The blends were extruded on a Werner-Pfleiderer 30 mm twin screw extruder and the extrudate tested for heat and smoke release. The test results and the proportions of phenylsiloxane are shown in Table II, below.

TABLE 11

| EXAMPLE NO. | PARTS SF-1265 (%) | PRHR | HTOT (5 MIN) | PSRR | STOT (5 MIN) |
|---|---|---|---|---|---|
| 5 | — | 221 | 380 | 893 | 801 |
| 6 | 1 | 113 | 267 | 414 | 304 |
| 7 | 2 | 119 | 250 | 425 | 282 |
| 8 | 5 | 115 | 260 | 418 | 301 |
| 9 | 8 | 124 | 254 | 511 | 324 |

What is claimed:

1. An improved electrically conductive article, comprising:
   (a) an electrical conductor; and
   (b) a coating material disposed over the conductor, and formed from an electrically insulative, flame retardant, thermoplastic, flexible, halogen-free composition which comprises:
      (i) 100 parts by weight of a thermoplastic polyphenylene ether resin;
      (ii) 5 to 50 parts by weight of a phenylsiloxane fluid, said phenylsiloxane having a weight average molecular weight within the range of from about 800 to 100,000, said phenylsiloxane consisting essentially of chemically combined units of the formulae:
         (a) $(C_6H_5)_2SiO$
         (b) $(CH_3(C_6H_5))SiO$ and
         (c) $(CH_3)_2SiO$ where there is present in the phenylsiloxane fluid from 20 to 40 mol % of (a), or 40 to 80 mole % of (b), and 21 to 79 mole % of the sum of (a) +(b), based on the total moles of (a), (b), and (c); and
      (iii) a flexibilizing proportion of an elastomeric block copolymer having a hydrogenated A-B-A' structure, wherein A and A' are polymerized vinyl aromatic hydrocarbon blocks, and B is an ethylene-butylene block, and wherein the block copolymer has a weight average molecular weight of from about 40,000 to 100,000 and the average molecular weight of each block A and A' is independently in the range of about 4,000 to about 15,000, and the weight average molecular weight of the B block is in the range of about 25,000 to about 90,000.

2. The article of claim 1 wherein the coating material is applied directly to the conductor surface, or to the conductor surface which has been coated with another material.

3. The article of claim 1 wherein the coating is applied over an insulating layer of a polymeric material which itself is applied over the conductor surface.

4. The article of claim 1 wherein the conductor material comprises copper metal, alloys containing copper or aluminum metal.

5. The electrically conductive article of claim 1, wherein said phenylsiloxane fluid comprises from about 5 to 20 parts by weight of the composition.

6. An improved electrically conductive article, comprising:
 (a) an electrical conductor; and
 (b) a coating material disposed over the conductor, and formed from an electrically insulative, flame retardant, thermoplastic, flexible halogen-free composition which consists essentially of:
  (i) 100 parts by weight of a thermoplastic polyphenylene ether resin;
  (ii) 5 to 50 parts by weight of a phenylsiloxane fluid, said phenylsiloxane having a weight average molecular weight within the range of from about 800 to 100,000, said phenylsiloxane consisting essentially of chemically combined units of the formulae:
   (a) $(C_6H_5)_2SiO$
   (b) $(CH_3(C_6H_5))SiO$ and
   (c) $(CH_3)_2SiO$
    where there is present in the phenylsiloxane fluid from 20 to 40 mole % of (a), or 40 to 80 mole % of (b), and 21 to 79 mole % of the sum of (a)+(b), based on the total moles of (a), (b), and (c); and
  (iii) a flexibilizing proportion of an elastomeric block copolymer having a hydorgenated A-B-A' structure, wherein A and A' are polymerized vinyl aromatic hydrocarbon blocks, and B is an ethylene-butylene block, and
 wherein the block copolymer has a weight average molecular weight of from about 40,000 to 100,000 and the average molecular weight of each block A and A' is independently in the range of about 4,000 to about 15,000, and the weight average molecular weight of the B block is in the range of about 25,000 to about 90,000.

7. An improved electrically conductive article, comprising:
 (a) an electrical conductor; and
 (b) a coating material disposed over the conductor, and formed from an electrically insulative, flame retardant, thermoplastic, flexible, halogen-free composition which consists of:
  (i) 100 parts by weight of a thermoplastic polyphenylene ether resin;
  (ii) 5 to 50 parts by weight of a phenylsiloxane fluid, said phenylsiloxane having a weight average molecular weight within the range of from about 800 to 100,000, said phenylsiloxane consisting essentially of chemically combined units of the formulae:
   (a) $(C_6H_5)_2SiO$
   (b) $(CH_3(C_6H_5))SiO$ and
   (c) $(CH_3)_2SiO$
    where there is present in the phenylsiloxane fluid from 20 to 40 mole % of (a), or 40 to 80 mole % of (b), and 21 to 79 mole % of the sum of (a)+(b), based on the total moles of (a), (b), and (c); and
  (iii) a flexibilizing proportion of an elastomeric block copolymer having a hydrogenated A-B-A' structure, wherein A and A' are polymerized vinyl aromatic hydrocarbon blocks, and B is an ethylene-butylene block, and
 wherein the block copolymer has a weight average molecular weight of from about 40,000 to 100,000 and the average molecular weight of each block A and A' is independently in the range of about 4,000 to about 15,000, and the weight average molecular weight of the B block is in the range of about 25,000 to about 90,000.

8. A method for making an improved electrically conductive article, comprising the steps of:
 (a) providing an electrical conductor;
 (b) coating said electrical conductor with a coating material formed from an electrically insulative, flame retardant, thermoplastic, flexible, halogen-free composition which comprises:
  (i) 100 parts by weight of a thermoplastic polyphenylene ether resin;
  (ii) 5 to 50 parts by weight of a phenylsiloxane fluid, said phenylsiloxane having a weight average molecular weight within the range of from about 800 to 100,000
   (a) $(C_6H_5)_2SiO$
   (b) $(CH_3(C_6H_5))SiO$ and
   (c) $(CH_3)_2SiO$
    where there is present in the phenylsiloxane fluid from 20 to 40 mole % of (a), or 40 to 80 mole % of (b), and 21 to 79 mole % of the sum of (a)+(b), based on the total moles of (a), (b), and (c); and
  (iii) a flexibilizing proportion of an elastomeric block copolymer having a hydrogenated A-B-A' structure, wherein A and A' are polymerized vinyl aromatic hydrocarbon blocks, and B is an ethylene-butylene block, and
 wherein the block copolymer has a weight average molecular weight of from about 40,000 to 100,000 and the average molecular weight of each block A and A' is independently in the range of about 4,000 to about 15,000, and the weight average molecular weight of the B block is in the range of about 25,000 to about 90,000.

* * * * *